United States Patent
Caudy et al.

(10) Patent No.: US 9,836,494 B2
(45) Date of Patent: Dec. 5, 2017

(54) IMPORTATION, PRESENTATION, AND PERSISTENT STORAGE OF DATA

(71) Applicant: Walleye Software, LLC, Plymouth, MN (US)

(72) Inventors: Ryan Caudy, New York, NY (US); David R. Kent, IV, Colorado Springs, CO (US); Charles Wright, Cortlandt Manor, NY (US); Radu Teodorescu, New York, NY (US)

(73) Assignee: Illumon LLC, Plymouth, MN (US)

( * ) Notice: Subject to any disclaimer, the term of this patent is extended or adjusted under 35 U.S.C. 154(b) by 0 days.

(21) Appl. No.: 15/154,999

(22) Filed: May 14, 2016

(65) Prior Publication Data

US 2016/0335163 A1 Nov. 17, 2016

Related U.S. Application Data

(60) Provisional application No. 62/161,813, filed on May 14, 2015.

(51) Int. Cl.
G06F 11/00 (2006.01)
G06F 17/30 (2006.01)
(Continued)

(52) U.S. Cl.
CPC ...... *G06F 17/30368* (2013.01); *G06F 3/0481* (2013.01); *G06F 3/0482* (2013.01);
(Continued)

(58) Field of Classification Search
CPC ......... G06F 17/30315; G06F 17/30371; G06F 17/30516; G06F 17/30377; G06F 11/1407
See application file for complete search history.

(56) References Cited

U.S. PATENT DOCUMENTS 5,335,202 A 8/1994 Manning et al.
5,452,434 A 9/1995 Macdonald
(Continued)

FOREIGN PATENT DOCUMENTS

CA 2309462 A1 12/2000
EP 1406463 A2 4/2004
(Continued)

OTHER PUBLICATIONS

"IBM Informix TimeSeries data management", dated Jan. 18, 2016. Retrieved from https://web.archive.org/web/20160118072141/http://www-01.ibm.com/software/data/informix/timeseries/.
(Continued)

*Primary Examiner* — Yolanda L Wilson
(74) *Attorney, Agent, or Firm* — Carmichael IP, PLLC

(57) ABSTRACT

The disclosed subject matter includes systems, methods, and computer readable medium for importing/presenting data for computer system use. A logging process can receive data. Log file(s) can be created in memory. A listener can parse received log data to be appended to columns. A log tailer process can transmit data read from log file(s) to data import server(s). At data import server(s): the data can be written to column(s) of the associated table location in cache memory buffers, for immediate use by data consumers and for writing to persistent storage; a current number of rows of data written to the cache memory buffers can be confirmed; column data can be synchronized from the cache memory buffers into a persistent table data store; and table location metadata can be updated. A check point can be written for the persisted data for resuming import after a fault.

29 Claims, 7 Drawing Sheets

(51) Int. Cl.

| | |
|---|---|
| G06F 3/0482 | (2013.01) |
| G06F 3/0489 | (2013.01) |
| G06F 17/22 | (2006.01) |
| G06F 17/24 | (2006.01) |
| G06F 17/27 | (2006.01) |
| G06F 12/084 | (2016.01) |
| H04L 12/58 | (2006.01) |
| G06F 15/173 | (2006.01) |
| G06F 3/0481 | (2013.01) |
| G06F 3/0484 | (2013.01) |
| G06F 3/0485 | (2013.01) |
| G06F 12/02 | (2006.01) |
| G06F 9/44 | (2006.01) |
| G06F 9/45 | (2006.01) |
| H04L 29/08 | (2006.01) |
| G06F 3/06 | (2006.01) |
| G06F 11/14 | (2006.01) |
| H04L 29/06 | (2006.01) |
| G06F 9/445 | (2006.01) |
| H04L 12/18 | (2006.01) |
| H04L 29/12 | (2006.01) |

(52) U.S. Cl.
CPC ........ *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 15/17331* (2013.01); *G06F 17/2235* (2013.01); *G06F 17/24* (2013.01); *G06F 17/246* (2013.01); *G06F 17/276* (2013.01); *G06F 17/2715* (2013.01); *G06F 17/30117* (2013.01); *G06F 17/30312* (2013.01); *G06F 17/30315* (2013.01); *G06F 17/30321* (2013.01); *G06F 17/30324* (2013.01); *G06F 17/30327* (2013.01); *G06F 17/30333* (2013.01); *G06F 17/30336* (2013.01); *G06F 17/30339* (2013.01); *G06F 17/30345* (2013.01); *G06F 17/30371* (2013.01); *G06F 17/30374* (2013.01); *G06F 17/30377* (2013.01); *G06F 17/30398* (2013.01); *G06F 17/30424* (2013.01); *G06F 17/30448* (2013.01); *G06F 17/30454* (2013.01); *G06F 17/30477* (2013.01); *G06F 17/30522* (2013.01); *G06F 17/30528* (2013.01); *G06F 17/30554* (2013.01); *G06F 17/30563* (2013.01); *G06F 17/30584* (2013.01); *G06F 17/30598* (2013.01); *G06F 17/30864* (2013.01); *G06F 17/30867* (2013.01); *G06F 17/30887* (2013.01); *G06F 17/30958* (2013.01); *G06F 17/30997* (2013.01); *H04L 12/18* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/34* (2013.01); *H04L 67/42* (2013.01); *H04L 69/16* (2013.01); *G06F 2201/805* (2013.01); *G06F 2201/84* (2013.01); *G06F 2212/60* (2013.01)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,428 A | 7/1998 | Hart |
| 5,806,059 A | 9/1998 | Tsuchida et al. |
| 5,859,972 A | 1/1999 | Subramaniam et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,266,669 B1 | 7/2001 | Brodersen et al. |
| 6,289,357 B1 | 9/2001 | Parker |
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,816,855 B2 | 11/2004 | Hartel et al. |
| 6,820,082 B1 | 11/2004 | Cook et al. |
| 6,829,620 B2 | 12/2004 | Hsing et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |

(56) References Cited

U.S. PATENT DOCUMENTS

| | | |
|---|---|---|
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,529,734 B2 | 5/2009 | Dirisala |
| 7,529,750 B2 | 5/2009 | Bair |
| 7,610,351 B1 | 10/2009 | Gollapudi et al. |
| 7,624,126 B2 | 11/2009 | Pizzo et al. |
| 7,661,141 B2 | 2/2010 | Dutta et al. |
| 7,664,778 B2 | 2/2010 | Yagoub et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,631,034 B1 | 1/2014 | Peloski |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,793,243 B2 | 7/2014 | Weyerhaeuser et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 * | 11/2014 | Kimmel .............. G06F 12/0246 711/103 |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 * | 12/2014 | Driesen ............. G06F 17/30306 707/703 |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,195,712 B2 | 11/2015 | Freedman et al. |
| 9,298,768 B2 | 3/2016 | Varakin et al. |
| 9,372,671 B2 | 6/2016 | Balan et al. |
| 9,384,184 B2 | 7/2016 | Cervantes et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0233632 A1 | 12/2003 | Aigen et al. |
| 2004/0002961 A1 | 1/2004 | Dettinger et al. |
| 2004/0148630 A1 | 7/2004 | Choi |
| 2004/0186813 A1 | 9/2004 | Tedesco et al. |

(56) References Cited

U.S. PATENT DOCUMENTS

| | | |
|---|---|---|
| 2004/0216150 A1 | 10/2004 | Scheifler et al. |
| 2004/0220923 A1 | 11/2004 | Nica |
| 2004/0254876 A1 | 12/2004 | Coval et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0165866 A1 | 7/2005 | Bohannon et al. |
| 2005/0198001 A1 | 9/2005 | Cunningham et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0271510 A1 | 11/2006 | Harward et al. |
| 2006/0277162 A1* | 12/2006 | Smith ............... G06F 17/30386 |
| 2007/0011211 A1 | 1/2007 | Reeves et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0169003 A1 | 7/2007 | Branda et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0046804 A1 | 2/2008 | Rui et al. |
| 2008/0072150 A1 | 3/2008 | Chan et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0037391 A1 | 2/2009 | Agrawal et al. |
| 2009/0055370 A1 | 2/2009 | Dagum et al. |
| 2009/0089312 A1 | 4/2009 | Chi et al. |
| 2009/0248902 A1 | 10/2009 | Blue |
| 2009/0254516 A1 | 10/2009 | Meiyyappan et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0036801 A1 | 2/2010 | Pirvali et al. |
| 2010/0047760 A1 | 2/2010 | Best et al. |
| 2010/0049715 A1 | 2/2010 | Jacobsen et al. |
| 2010/0161555 A1 | 6/2010 | Nica et al. |
| 2010/0186082 A1 | 7/2010 | Ladki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0194563 A1 | 8/2011 | Shen et al. |
| 2011/0314019 A1 | 12/2011 | Peris |
| 2012/0110030 A1 | 5/2012 | Pomponio |
| 2012/0144234 A1 | 6/2012 | Clark et al. |
| 2012/0159303 A1 | 6/2012 | Friedrich et al. |
| 2012/0191446 A1 | 7/2012 | Binsztok et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1* | 8/2012 | Renkes ............. G06F 17/30315 707/674 |
| 2012/0246052 A1 | 9/2012 | Taylor et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166556 A1 | 6/2013 | Baeumges et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0346365 A1 | 12/2013 | Kan et al. |
| 2014/0019494 A1* | 1/2014 | Tang ................. G06F 17/30091 707/825 |
| 2014/0040203 A1* | 2/2014 | Lu ..................... G06F 17/30575 707/634 |
| 2014/0059646 A1 | 2/2014 | Hannel et al. |
| 2014/0082724 A1* | 3/2014 | Pearson ............... G06F 21/575 726/22 |
| 2014/0136521 A1 | 5/2014 | Pappas |
| 2014/0143123 A1 | 5/2014 | Banke et al. |
| 2014/0149997 A1 | 5/2014 | Kukreja et al. |
| 2014/0156618 A1 | 6/2014 | Castellano |
| 2014/0173023 A1 | 6/2014 | Varney et al. |
| 2014/0181036 A1* | 6/2014 | Dhamankar ...... G06F 17/30144 707/648 |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1* | 8/2014 | Rambo ............. G06F 17/30339 707/692 |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0297611 A1 | 10/2014 | Abbour et al. |
| 2014/0317084 A1 | 10/2014 | Chaudhry et al. |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0127599 A1* | 5/2015 | Schiebeler ........ G06F 17/30377 707/602 |
| 2015/0172117 A1 | 6/2015 | Dolinsky et al. |
| 2015/0188778 A1 | 7/2015 | Asayag et al. |
| 2015/0205588 A1 | 7/2015 | Bates et al. |

(56) References Cited

U.S. PATENT DOCUMENTS

| | | | | |
|---|---|---|---|---|
| 2015/0254298 A1* | 9/2015 | Bourbonnais | ..... | G06F 17/30371 707/610 |
| 2015/0304182 A1 | 10/2015 | Brodsky et al. | | |
| 2016/0026442 A1 | 1/2016 | Chhaparia | | |
| 2016/0065670 A1 | 3/2016 | Kimmel et al. | | |
| 2016/0125018 A1* | 5/2016 | Tomoda | ................. | G06F 17/30 707/703 |
| 2016/0253294 A1 | 9/2016 | Allen et al. | | |

FOREIGN PATENT DOCUMENTS

| | | | | |
|---|---|---|---|---|
| EP | 1198769 B1 | 6/2008 | | |
| EP | 2199961 A1 | 6/2010 | | |
| EP | 2423816 A1 | 2/2012 | | |
| EP | 2743839 A1 | 6/2014 | | |
| RU | 2421798 | 6/2011 | | |
| WO | 2000000879 A2 | 1/2000 | | |
| WO | 2001079964 A2 | 10/2001 | | |
| WO | WO 0179964 A2 * | 10/2001 | ....... | G06F 17/30038 |
| WO | 2011120161 A1 | 10/2011 | | |
| WO | 2012136627 A1 | 10/2012 | | |
| WO | WO-2014026220 A1 | 2/2014 | | |
| WO | 2014143208 A1 | 9/2014 | | |

OTHER PUBLICATIONS

"IBM—What is HBase?", dated Sep. 6, 2015. Retrieved from https://web.archive.org/web/20150906022050/http://www-01.ibm.com/software/data/infosphere/hadoop/hbase/.

"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.

"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.

"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.

"Sophia Database—Architecture", dated Jan. 18, 2016. Retrieved from https://web.archive.org/web/20160118052919/http://sphia.org/architecture.html.

"Google Protocol RPC Library Overview", dated Apr. 27, 2016. Retrieved from https://cloud.google.com/appengine/docs/python/tools/protorpc/ (last accessed Jun. 16, 2016).

"Maximize Data Value with Very Large Database Management by SAP® Sybase® IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.

"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.

"IBM InfoSphere Big Insights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Oracle® Big Data Appliance—Software User's Guide", dated Feb. 2015. Retrieved from https://docs.oracle.com/cd/E55905_01/doc.40/e55814.pdf.

"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).

"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).

Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).

Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).

Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).

Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.

"Change Data Capture", Oracle Database Online Documentation 11g Release 1 (11.1), dated Apr. 5, 2016. Retrieved from https://web.archive.org/web/20160405032625/http://docs.oracle.com/cd/B28359_01/server.111/b28313/cdc.htm.

"Chapter 24. Query access plans", Tuning Database Performance, DB2 Version 9.5 for Linux, UNIX, and Windows, pp. 301-462, dated Dec. 2010. Retrieved from http://public.dhe.ibm.com/ps/products/db2/info/vr95/pdf/en_US/DB2PerfTuneTroubleshoot-db2d3e953.pdf.

"Tracking Data Changes", SQL Server 2008 R2, dated Sep. 22, 2015. Retreived from https://web.archive.org/web/20150922000614/https://technet.microsoft.com/en-us/library/bb933994(v=sql.105).aspx.

Borror, Jefferey A "Q for Mortals 2.0", dated Nov. 1, 2011. Retreived from http://code.kx.com/wiki/JB:QforMortals2/contents.

Gai, Lei et al. "An Efficient Summary Graph Driven Method for RDF Query Processing", dated Oct. 27, 2015. Retreived from http://arxiv.org/pdf/1510.07749.pdf.

Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.

Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.

Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde.2015.pdf.

International Search Report and Written Opinion dated Aug. 18, 2016, in International Appln. No. PCT/US2016/032582 filed May 14, 2016.

International Search Report and Written Opinion dated Aug. 18, 2016, in International Appln. No. PCT/US2016/032584 filed May 14, 2016.

International Search Report and Written Opinion dated Aug. 18, 2016, in International Appln. No. PCT/US2016/032588 filed May 14, 2016.

International Search Report and Written Opinion dated Aug. 18, 2016, in International Appln. No. PCT/US2016/032593 filed May 14, 2016.

International Search Report and Written Opinion dated Aug. 18, 2016, in International Appln. No. PCT/US2016/032597 filed May 14, 2016.

(56) References Cited

OTHER PUBLICATIONS

International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Mallet, "Relational Database Support for Spatio-Temporal Data", Technical Report TR 04-21, Sep. 2004, University of Alberta, Department of Computing Science.
Non-final Office Action dated Aug. 12, 2016, in U.S. Appl. No. 15/155,001.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.
Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Oct. 11, 2016, in U.S. Appl. No. 15/155,007.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.

\* cited by examiner

IMPORTATION, PRESENTATION, AND PERSISTENT STORAGE OF DATA This application claims the benefit of U.S. Provisional Application No. 62/161,813, entitled "Computer Data System" and filed on May 14, 2015, which is incorporated herein by reference in its entirety.

Embodiments relate generally to computer data systems, and more particularly, to methods, systems and computer readable media for the importation, presentation, and persistent storage of data.

A data system can collect large amounts of continuous streams of data from numerous external and internal systems. Often the data is received in a raw format that is unusable by the data system until the data is reformatted and stored into a structure that is available to be used by the system's code, such as a table format with columns and rows of data. If the data system is used to make real-time or near-real-time decision, converting the data from a raw format to a useable format can become a time-critical system task. Also critical is a verification process to make sure the data being passed to users to make important decisions is valid and not corrupted or out of sequence. Often, the verification process can delay getting time-sensitive information to the end user, And if a system crash occurs before the verification process can start or complete, the system data can be left in a corrupted state requiring a roll-back to a previous time meaning the loss of potentially critical data.

Embodiments were conceived in light of the above mentioned needs, problems and/or limitations, among other things.

Some implementations can include computer data system for importing and presenting data for a computer system having cache memory buffers, persistent storage, and a listener device, the computer data system comprising one or more processors, computer readable storage coupled to the one or more processors, the computer readable storage having stored thereon instructions that, when executed by the one or more processors, cause the one or more processors to perform operations. The operations can include starting a logging process to receive a stream of data. The operations can also include creating in a computer memory device one or more log files. The operations can further include starting a log tailer process for reading data from the one or more log files and transmitting data read from log files. The operations can also include starting a listener to parse received log data to be appended to columns. The operations can include receiving a stream of data by the logging process. The operations can include the logging process writing the data into the one or more log files in a computer memory. The operations can also include the log tailer process reading data from the one or more log files. The operations can further include the log tailer process transmitting the data to one or more data import servers. The operations can include parsing the data with the listener. The operations can also include at the one or more data import servers, writing the data to one or more columns of the associated table location in cache memory buffers, for immediate use by data consumers and for writing to persistent storage. The operations can further include confirming, at the one or more data import servers, a current number of rows of data written to the cache memory buffers. The operations can also include synchronizing, at the one or more data import servers, the column data from the cache memory buffers into a persistent table data store. The operations can include updating, at the one or more data import servers, table location metadata. The operations can also include writing a check point for the persisted data for use in resuming import after a system fault.

The operations can include advertising an existence of imported table location data available in the cache memory buffers.

The operations can include wherein writing a check point for the cache memory buffers includes at least one of a table location size in rows, and a log file and byte-offset to resume from for the table location next row.

The operations can include writing state associated with each table location imported from the application process logs.

The operations can include wherein the logging process writes the data into the one or more log files in a computer memory by applying schema-specified, generated code to format the data. The operations can also include wherein the listener is generated from a schema.

The operations can also include wherein the one or more log files are row-oriented.

The operations can also include wherein the processor applies the state to validate data written to the persistent table data store.

Some implementations can include a method for importing and presenting data for computer system use, the method comprising starting with a processor a logging process to receive a stream of data. The method can also include creating in a computer memory device one or more log files. The method can further include starting with a processor a log tailer process for reading data from the one or more log files and transmitting data read from log files. The method can also include starting a listener to parse received log data to be appended to columns. The method can include receiving a stream of data by the logging process. The method can include the logging process writing the data into the one or more log files in a computer memory. The method can also include the log tailer process reading data from the one or more log files. The method can further include the log tailer process transmitting the data to one or more data import servers. The method can also include parsing the data with the listener. The method can include at the one or more data import servers, writing the data to one or more columns of the associated table location in cache memory buffers, for immediate use by data consumers and for writing to persistent storage. The method can also include confirming, at the one or more data import servers, a current number of rows of data written to the cache memory buffers. The method can include synchronizing, at the one or more data import servers, the column data from the cache memory buffers into a persistent table data store. The method can also include updating, at the one or more data import servers, table location metadata. The method can further include writing a check point for the persisted data for use in resuming import after a system fault.

The method can include advertising an existence of imported table location data available in the cache memory buffers.

The method can include wherein writing a check point for the cache memory buffers includes at least one of a table location size in rows, and a log file and byte-offset to resume from for the table location next row.

The method can include writing state associated with each table location imported from the application process logs.

The method can include wherein the logging process writes the data into the one or more log files in a computer memory by applying schema-specified, generated code to format the data. The method can also include wherein the listener is generated from a schema.

The method can also include wherein the one or more log files are row-oriented.

The method can also include wherein the processor applies the state to validate data written to the persistent table data store.

Some implementations can include a nontransitory computer readable medium having stored thereon software instructions that, when executed by one or more processors, cause the one or more processors to perform operations. The operations can include starting a logging process to receive a stream of data. The operations can also include creating in a computer memory device one or more log files. The operations can further include starting a log tailer process for reading data from the one or more log files and transmitting data read from log files. The operations can also include starting a listener to parse received log data to be appended to columns. The operations can include receiving a stream of data by the logging process. The operations can also include the logging process writing the data into the one or more log files in a computer memory. The operations can include the log tailer process reading data from the one or more log files. The operations can also include the log tailer process transmitting the data to one or more data import servers. The operations can include parsing the data with the listener. The operations can also include at the one or more data import servers, writing the data to one or more columns of the associated table location in cache memory buffers, for immediate use by data consumers and for writing to persistent storage. The operations can further include confirming, at the one or more data import servers, a current number of rows of data written to the cache memory buffers. The operations can also include synchronizing, at the one or more data import servers, the column data from the cache memory buffers into a persistent table data store. The operations can include updating, at the one or more data import servers, table location metadata. The operations can also include writing a check point for the persisted data for use in resuming import after a system fault.

The operations can include advertising an existence of imported table location data available in the cache memory buffers.

The operations can include wherein writing a check point for the cache memory buffers includes at least one of a table location size in rows, and a log file and byte-offset to resume from for the table location next row.

The operations can include writing state associated with each table location imported from the application process logs.

The operations can include wherein the logging process writes the data into the one or more log files in a computer memory by applying schema-specified, generated code to format the data. The operations can also include wherein the listener is generated from a schema.

The operations can include wherein the one or more log files are row-oriented.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
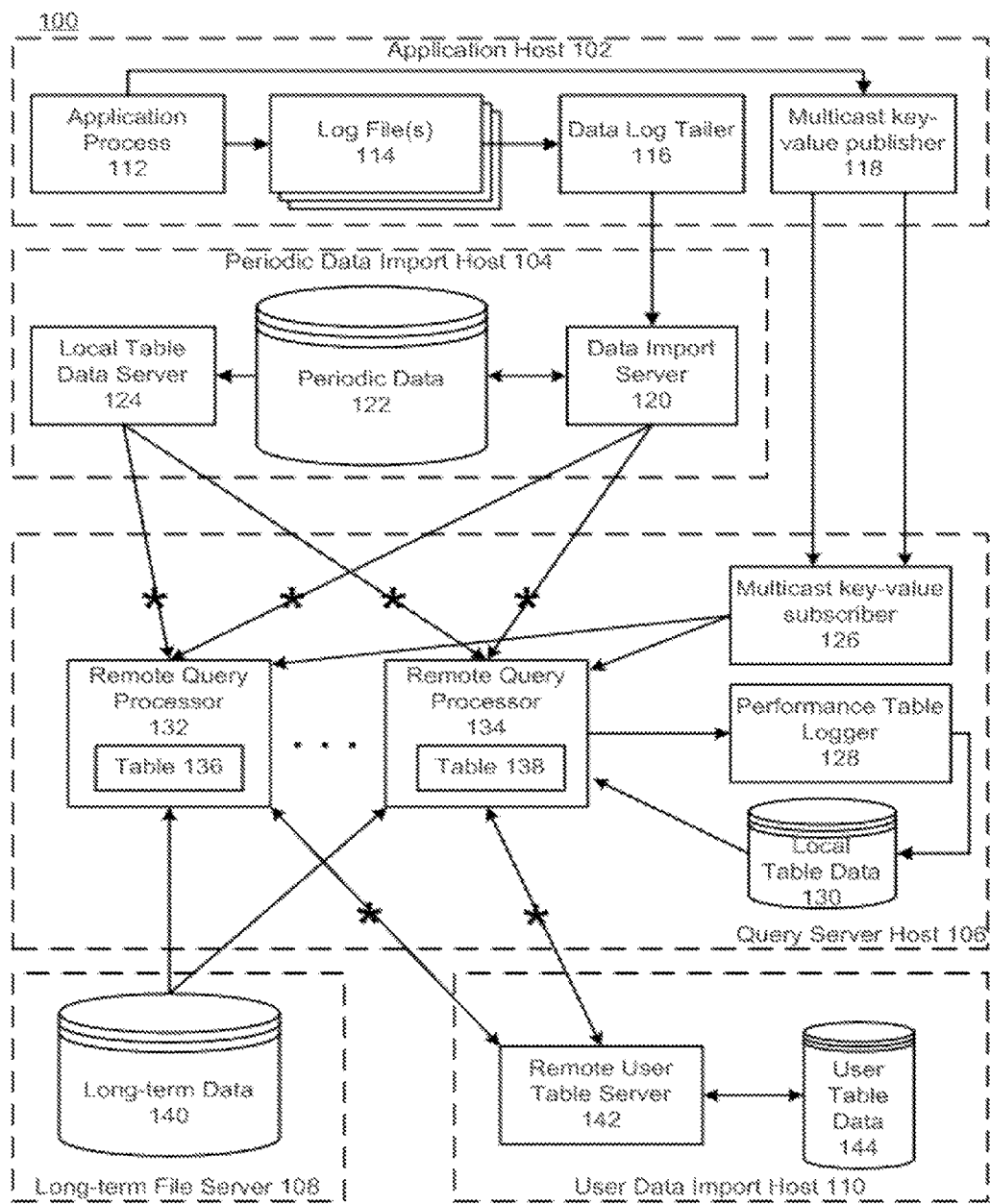
FIG. 1 is a diagram of an example computer data system showing an example data distribution configuration in accordance with some implementations.
Figure 2:
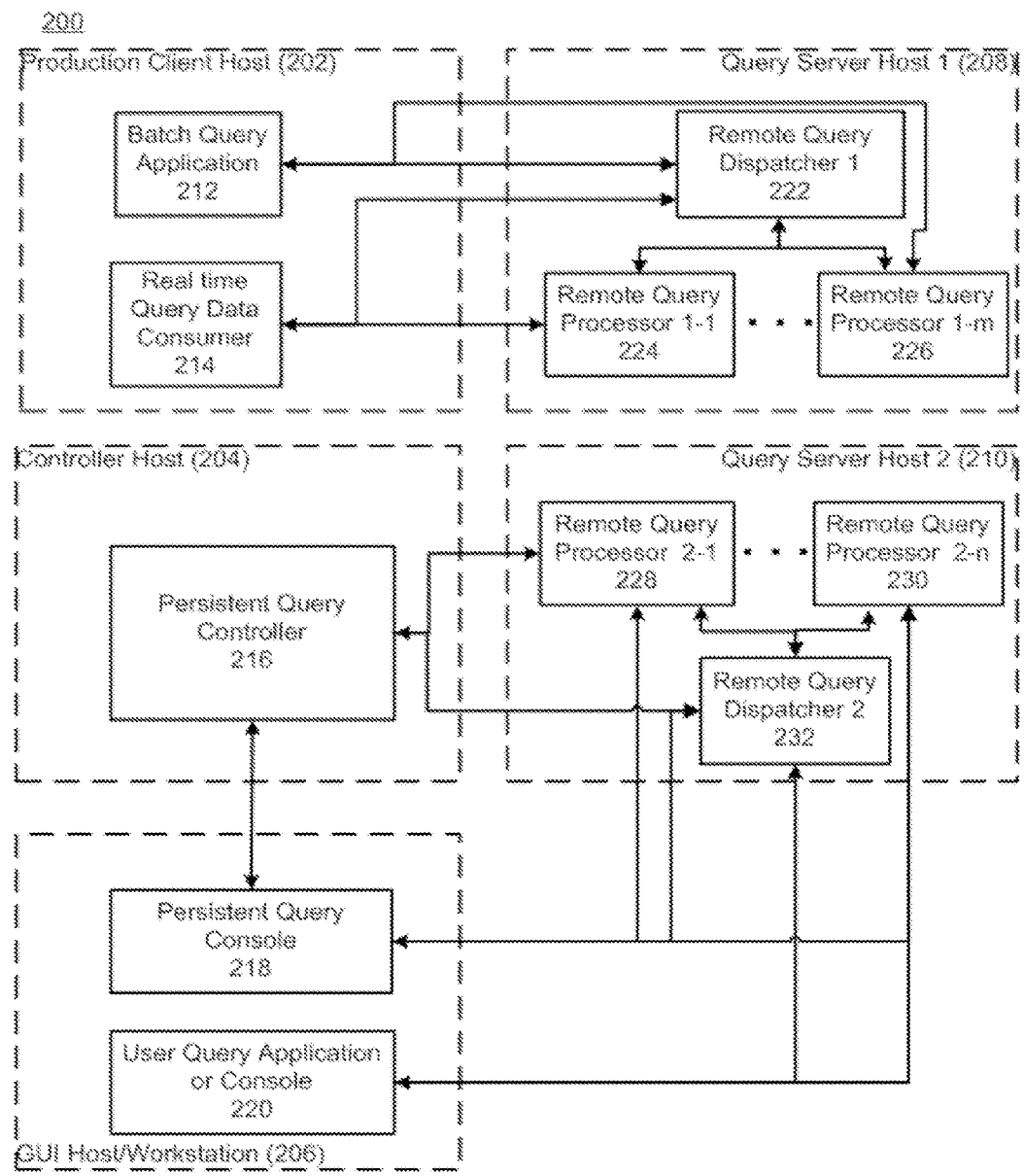
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object is can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
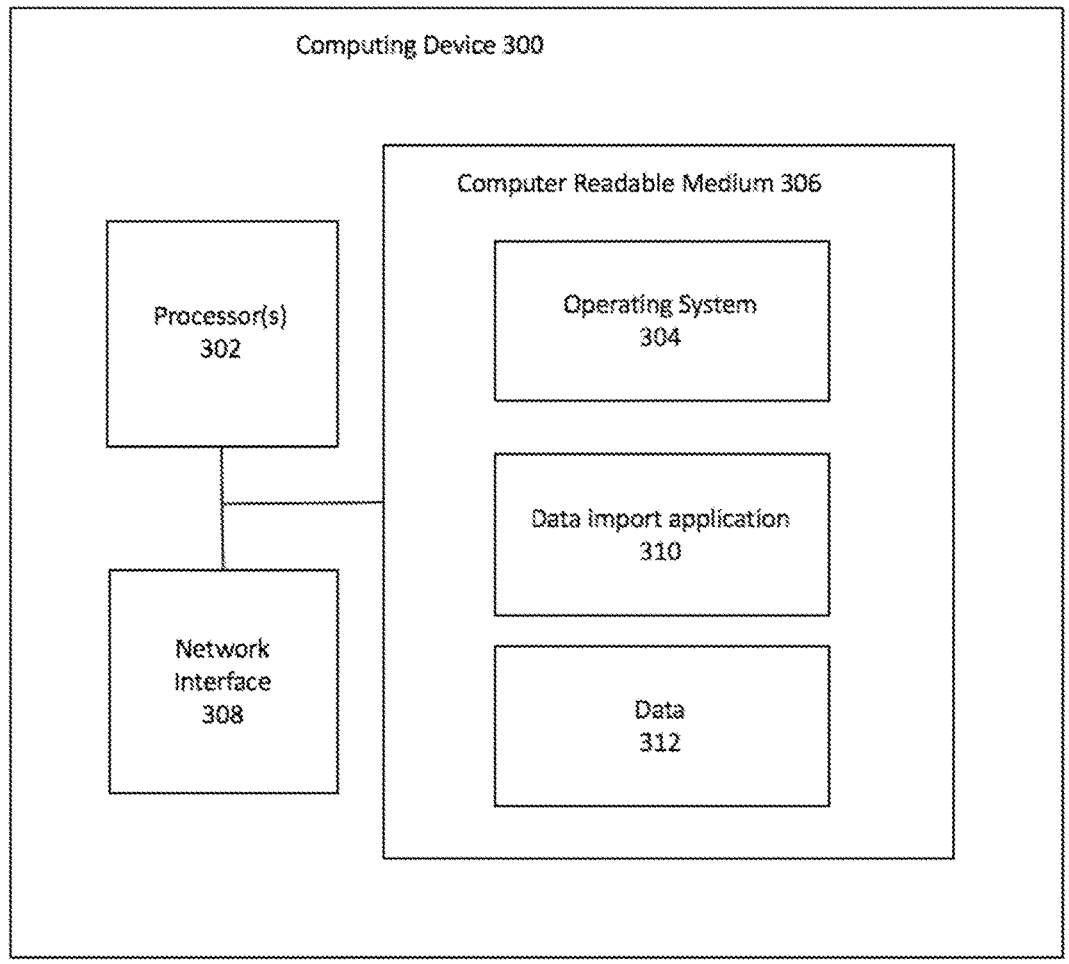
FIG. 3 is a diagram of an example computing device configured for data import processing in accordance with some implementations.

FIG. 3 is a diagram of an example computing device 300 in accordance with at least one implementation. The computing device 300 includes one or more processors 302, operating system 304, compute readable medium 306 and network interface 308. The memory 306 can include data import application 310 and a data section 312 (e.g., for storing ASTs, precompiled code, etc.).

In operation, the processor 302 may execute the application 310 stored in the memory 306. The application 310 can include software instructions that, when executed by the processor, cause the processor to perform operations for data importation in accordance with the present disclosure (e.g., performing one or more of 602-640 described below).

The data import application program 310 can operate in conjunction with the data section 312 and the operating system 304.

Large data-dependent systems can receive a continuous large stream of raw data from many different sources. For example, real-time securities trading systems can receive a continuous large stream of raw data from exchanges around the world that can be used by traders to make buy or sell decisions. Such decisions need fresh and timely data to avoid buying or selling at inopportune times, or using incorrect inputs to models that calculate theoretical prices, options "greeks", or other calculations of interest. In order for the system to provide near real-time data to its users, the system receives the raw data on a rolling basis, formats the data into a usable format, updates the proper sources with the properly formatted data, and advertises the data ready for use.

Figure 4:
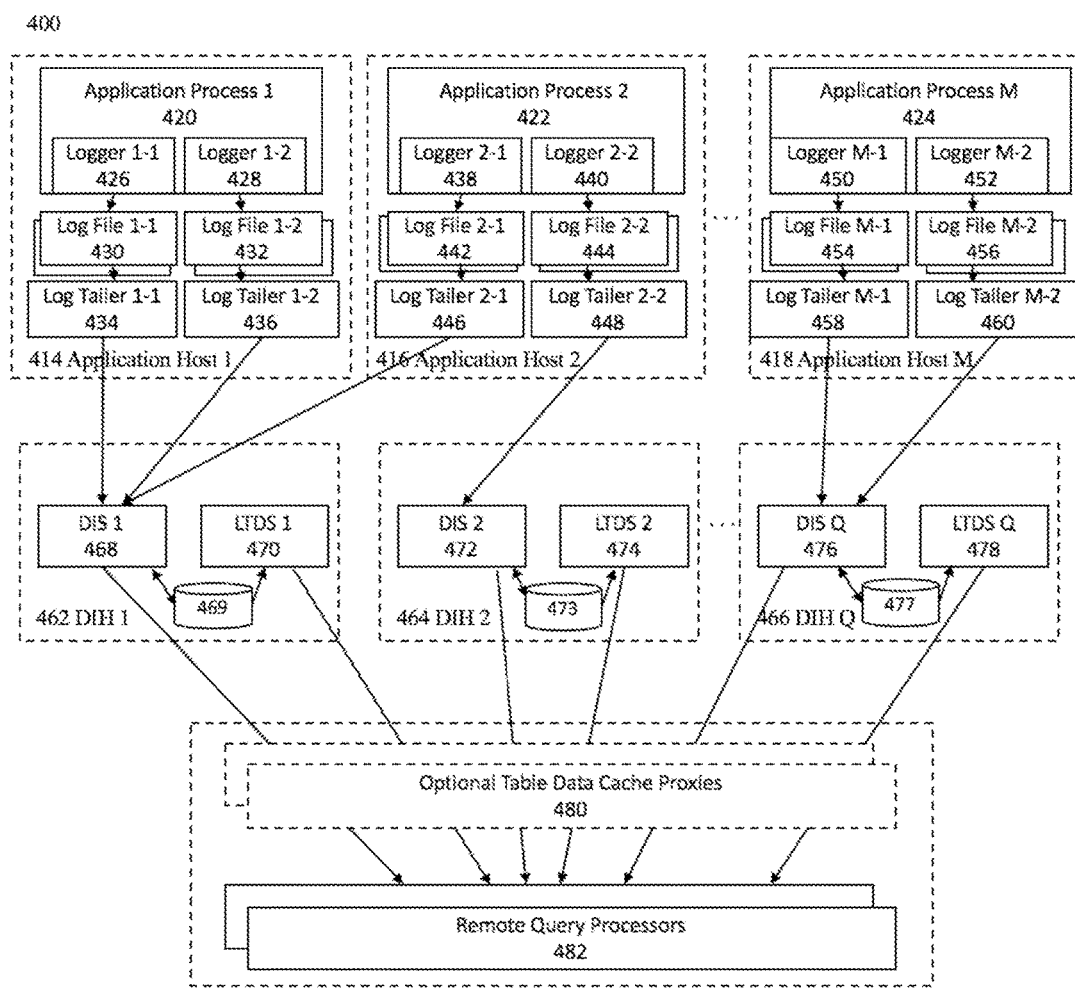
FIG. 4 is a diagram of an example data import system in accordance with some implementations.

FIG. 4 is a diagram of an example data import system 400 in accordance with some implementations. The data import system 400 can include one or more application hosts (414, 416, 418), one or more data import hosts (462, 464, 466), and optionally one or more table data cache proxies 480, and one or more remote query processors 482.

Each application host (414, 416, 418) can include one or more application processes (420, 422, 424), one or more loggers (426, 428, 438, 440, 450, 452), one or more log files (430, 432, 442, 444, 454, 456), and one or more log tailers (434, 436, 446, 448, 458, 460).

Each data import host (462, 464, 466) can include one or more data import servers (468, 472, 476), one or more local table data servers (470, 474, 478), and a direct or remote connection to one or more periodic table data stores (469, 473, 477) (e.g., a column-oriented table data store).

Row-oriented log files and column-oriented table data stores are discussed herein for illustration purposes and are not intended to be limiting. It will be appreciated that log files and/or data stores may be configured in other ways. In general, any data stores discussed herein could be configured in manner suitable for a contemplated implementation.

In operation, each application process (420, 422, 424) can be configured to receive input data from a source (e.g., a securities trading data source), apply schema-specified, generated code to format the logged data as the data is being prepared for output to the one or more log files (430, 432, 442, 444, 454, 456) and store the received data in the one or more sequential, row-oriented log files (430, 432, 442, 444, 454, 456) via the one or more data loggers (426, 428, 438, 440, 450, 452). Logging raw input data to log files can additionally serve to provide a backup copy of data that can be used in the event that downstream processing of the input data is halted or interrupted or otherwise becomes unreliable.

It will be appreciated that one logger can write data to a sequence of log files with a timestamp embedded in the log file filename such that later file names can be sorted to present earlier log files in lexicographical order.

One or more log tailers (434, 436, 446, 448, 458, 460) can be configured to access the sequential, row oriented one or more log files (430, 432, 442, 444, 454, 456) to retrieve input data logged by the loggers (426, 428, 438, 440, 450, 452). In some implementations, the one or more log tailers (434, 436, 446, 448, 458, 460) can be configured to perform strict byte reading and transmission (e.g., to one or more data import servers (468, 472, 476)).

The one or more data import servers (468, 472, 476) can be configured to store the input data into one or more corresponding data stores such as the periodic table data stores (469, 473, 477) in a column-oriented configuration. The one or more periodic data stores (469, 473, 477) can be used to store data that is being received within a time period (e.g., a second, a minute, an hour, a day, etc.) and which may be later processed and stored in a data store of a long-term file server (not shown). For example, the one or more periodic table data stores (469, 473, 477) can include a plurality of data servers configured to store periodic securities trading data according to one or more characteristics of the data (e.g., a data value such as security symbol, the data sources such as a given trading exchange, etc.).

The one or more data import servers (468, 472, 476) can be configured to receive and store data into the one or more periodic table data stores (469, 473, 477) in such a way as to provide a consistent data presentation to other parts of the system. Providing and ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as one or more remote query processors 482, then the data may be persisted in some fashion (e.g., written to disk).

The one or more local table data servers (470, 474, 478) can be configured to retrieve data stored in the one or more periodic table data stores (469, 473, 477) and to provide the retrieved data to one or more remote query processors (482) directly or via one or more optional table data cache proxies 480. The local table data servers (470, 474, 478) can export a filesystem-backed table data service and need not communicate directly with the data import servers (468, 472, 476). The role of the local table data servers (470, 474, 478) can be to serve data that was written during previous intervals (e.g., days) by data import servers (468, 472, 476) and which is data that is no longer being actively updated.

The one or more remote query processors (482) can use data from the one or more data import servers (468, 472, 476), one or more local table data servers (470, 474 478), and/or from one or more long-term file servers (not shown) to perform queries.

Figure 4A:
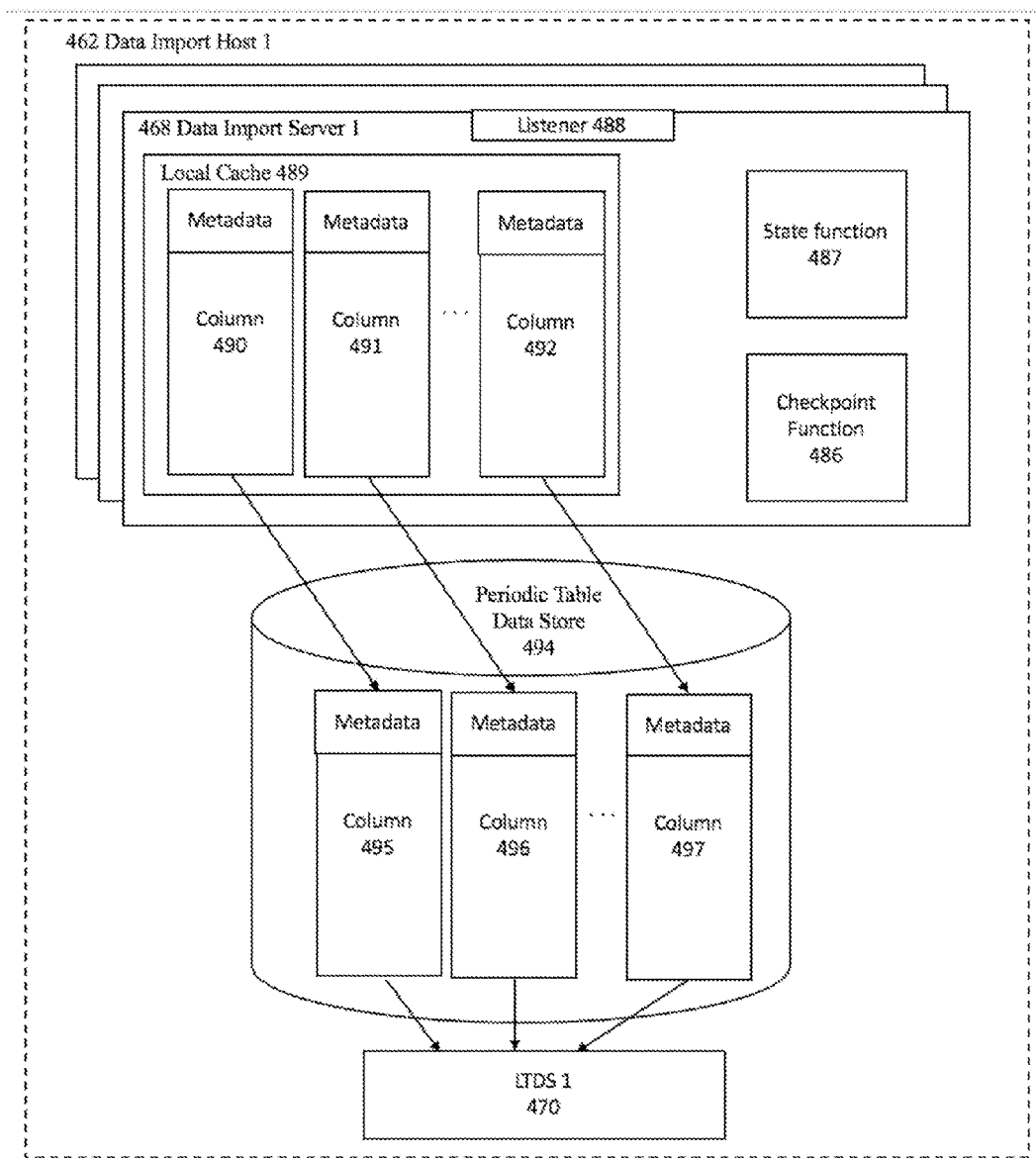
FIG. 4A is a diagram of an example data import host in accordance with some implementations.

FIG. 4A is an example data import host 462 in accordance with some implementations. The data import host 462 can include one or more data import servers 468, a periodic table data store 494, and a local table data server 470.

Each of the one or more data import servers 468 can include a listener 488, a local memory cache 489, a checkpoint function 486, and a state function 487. The local memory cache 489 can include one or more columns with metadata (490, 491, 492). The periodic table data store 494 can also include one or more columns with metadata (495, 496 497).

In operation, the listener 488 can be generated from a schema to parse received log data to be appended to columns (490, 491, 492, 495, 496, 497). After the data is parsed by the listener 488, the data import server 468 can write the data to local cache 489 in the columns (490, 491, 492) and then can write from the columns (490, 491, 492) to the appropriate periodic table data store (494) columns (495, 496, 497) asynchronously. The local cache 489 is filled in-place as data is received from the log milers via the listener 488. After the data is written to local cache 489, the availability of the data in the cache 489 can be advertised by the data import server 468 to clients such as remote query processors 482.

It will be appreciated that data can be committed by forcing the data from local cache to a periodic table data store (494). After data is committed, persistent table location metadata can be updated accordingly. The persistent table location metadata can comprise size, modification time, validation status and validation completion time, schema version used to generate the data, code version used to generate the data, user identifying information, and other metadata.

The checkpoint function 486 can confirm the current number of rows written to local cache 489 and the periodic table data store 494 and write a checkpoint. A checkpoint can be a table location's size in rows, and information about which log file and byte-offset to resume from for the next row. The state function 487 can keep and persist state associated with each table location and column file. The state function can also keep track of connections that have subscribed to advertisements from the data import server about the existence of new locations for a table, or the size (in rows) of individual table locations; progress into each log file by a log tailer; schema-specific data used for validation; and actual column file data and table location metadata, including size.

It will be appreciated that columns (e.g., 490, 491, 492, 495, 496, 497) can contain data that can be used to populate table object columns. For example, if a table object contains columns for stock symbols, date, time, and stock quote, one or more column files can exist for each of the table object columns. The table object can create a table index to map to the column data. It will also be appreciated that a single column file does not have to contain the full table column. For example, a table may contain rows for hundreds of stock symbols but a single column file may only contain rows for a single stock symbol.

It will also be appreciated that imported data can be advertised as soon as it is available without waiting for a check point. In the event of a system crash, the newly advertised data may be temporarily lost and not be available upon start-up of the system. Lost data can be regained by the one or more log tailers re-accessing the data from the one or more log files to resume importing data from the last check point.

Figure 5:
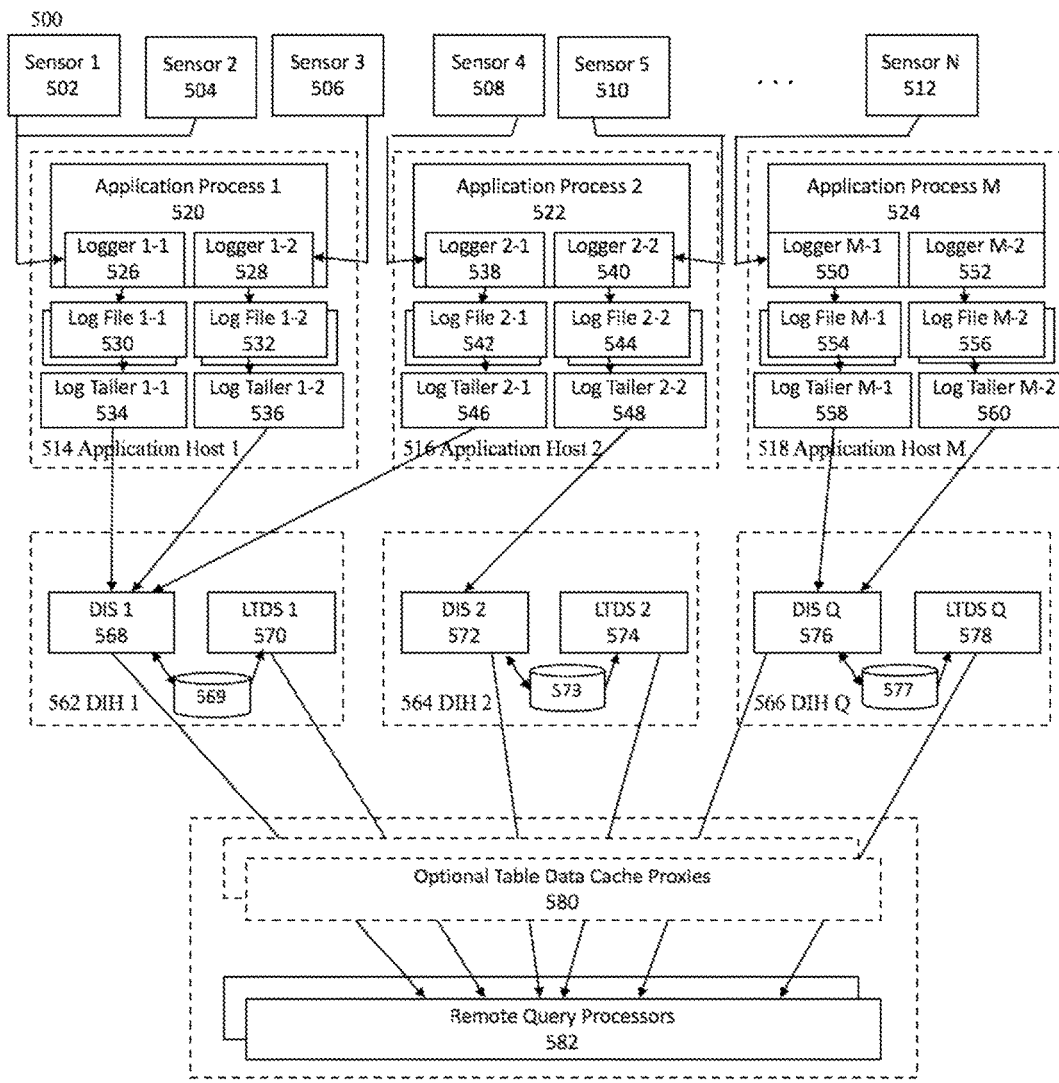
FIG. 5 is a diagram of an example data import system and sensors in accordance with some implementations.

FIG. 5 is an example data import system and sensors in accordance with some implementations. The data import system and sensors 500 can include one or more sensors (502, 504, 506, 508, 510, 512), one or more application hosts (514, 516, 518), one or more data import hosts (562, 564, 566), and optionally one or more table data cache proxies 580, and one or more remote query processors 582.

Each of the one or more sensors (502, 504, 506, 508, 510, 512) can include one or more internal sensors, one or more external sensors or a combination thereof.

It will be appreciated that a sensor can be any device that can measure and then transmit the measurement. Non-limiting examples of sensors include electronic water meters, electronic electric meters, door and window sensors, temperature sensors, motion sensors, car component sensors, etc.

It will also be appreciated that sensors may themselves contain or be attached to processors. These processors, code executing on these processors, or code executing in the application process may process the data.

Each application host (514, 516, 518) can include one or more application processes (520, 522, 524), one or more loggers (526, 528, 538, 540, 550, 552), one or more log files (530, 532, 542, 544, 554, 556), and one or more log tailers (534, 536, 546, 548, 558, 560).

Each data import host (562, 564, 566) can include one or more data import servers (568, 572, 576), one or more local table data servers (570, 574, 578), and a direct or remote connection to one or more periodic table data stores (569, 573, 577) (e.g., a column-oriented table data store).

Row-oriented log files and column-oriented table data stores are discussed herein for illustration purposes and are not intended to be limiting. It will be appreciated that log files and/or data stores may be configured in other ways. In general, any data stores discussed herein could be configured in manner suitable for a contemplated implementation.

In operation, each of the one or more sensors (502, 504, 506, 508, 510, 512) can transmit data to one or more of the application processes (520, 522, 524) that can be configured to receive input data from one or more sensors (502, 504, 506, 508, 510, 512). The one or more application processes (520, 522, 524) can apply schema-specified, generated code to format the logged data as the data is being prepared for output to the one or more log files (530, 532, 542, 544, 554, 556) and store the received data in the one or more sequential, row-oriented log files (530, 532, 542, 544, 554, 556) via the one or more data loggers (526, 528, 538, 540, 550, 552). Logging raw input data to log files can additionally serve to provide a backup copy of data that can be used in the event that downstream processing of the input data is halted or interrupted or otherwise becomes unreliable.

It will be appreciated that one logger can write data to a sequence of log files with a timestamp embedded in the log file filename such that later file names can be sorted to present earlier log files in lexicographical order.

One or more log tailers (534, 536, 546, 548, 558, 560) can be configured to access the sequential, row oriented one or more log files (530, 532, 542, 544, 554, 556) to retrieve input data logged by the loggers (526, 528, 538, 540, 550, 552). In some implementations, the one or more log tailers (534, 536, 546, 548, 558, 560) can be configured to perform strict byte reading and transmission (e.g., to one or more data import servers (568, 572, 576)).

The one or more data import servers (568, 572, 576) can be configured to store the input data into one or more corresponding data stores such as the periodic table data stores (569, 573, 577) in a column-oriented configuration. The one or more periodic data stores (569, 573, 577) can be used to store data that is being received within a time period (e.g., a second, a minute, an hour, a day, etc.) and which may be later processed and stored in a data store of a long-term file server (not shown). For example, the one or more periodic table data stores (569, 573, 577) can include a plurality of data servers configured to store periodic temperature data according to one or more characteristics of the data (e.g., a data value such as temperature, the data sources such as city temperature sensor, etc.).

The one or more data import servers (568, 572, 576) can be configured to receive and store data into the one or more periodic table data stores (569, 573, 577) in such a way as to provide a consistent data presentation to other parts of the system. Providing and ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as one or more remote query processors 582, then the data may be persisted in some fashion (e.g., written to disk).

The one or more local table data servers (570, 574, 578) can be configured to retrieve data stored in the one or more periodic table data stores (569, 573, 577) and to provide the retrieved data to one or more remote query processors (582) via one or more optional table data cache proxies 580. The local table data servers (570, 574, 578) can export a filesystem-backed table data service and need not communicate directly with the data import servers (568, 572, 576). The role of the local table data servers (570, 574, 578) can be to serve data that was written during previous intervals (e.g., days) by data import servers (568, 572, 576) and which is data that is no longer being actively updated.

The one or more remote query processors (582) can use data from the one or more data import servers (568, 572, 576), one or more local table data servers (570, 574 578), and/or from one or more long-term file servers (not shown) to perform queries.

Figure 6:
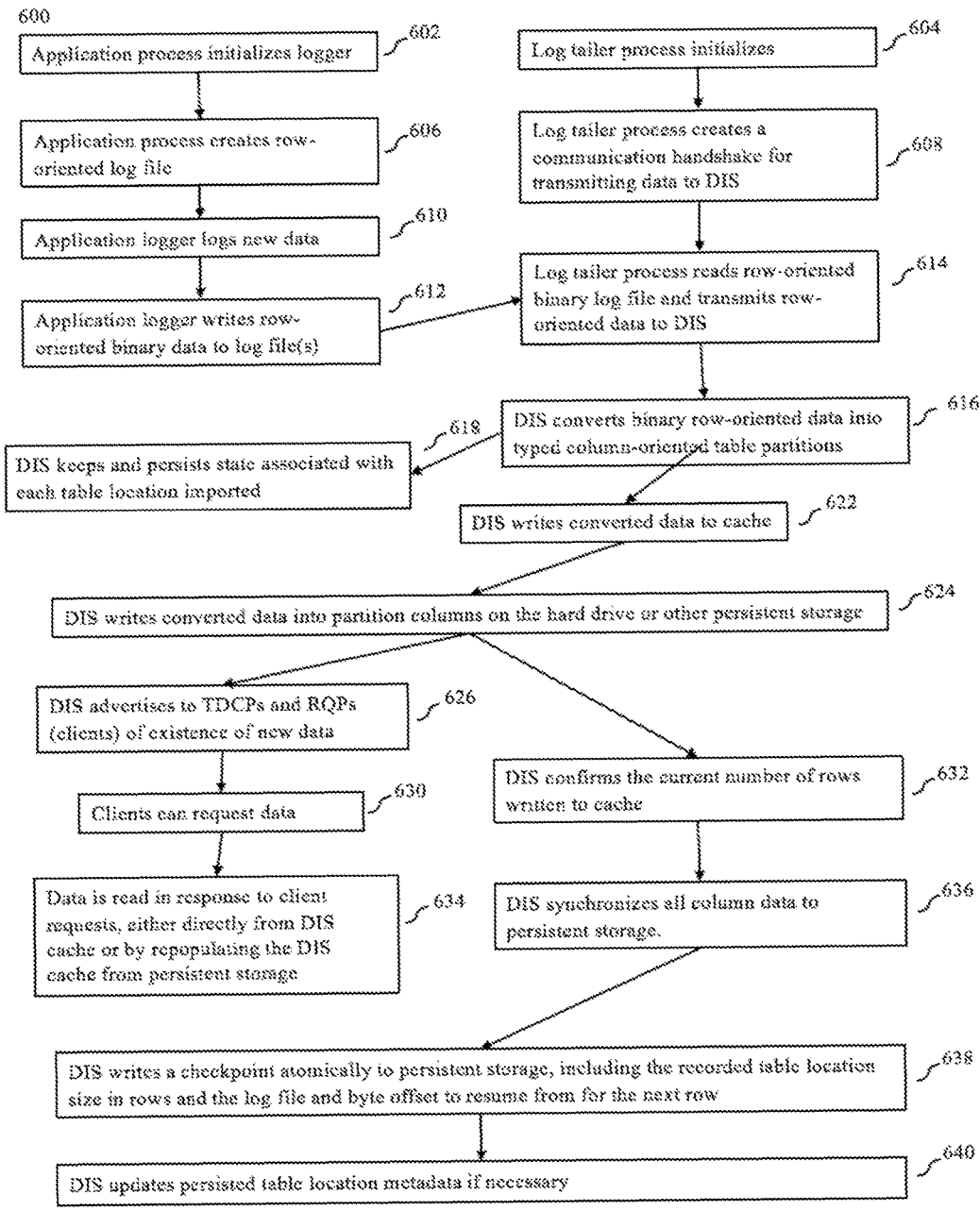
FIG. 6 is a flowchart of an example data importation process in accordance with some implementations.

FIG. 6 is a flowchart of an example data importation process 600 in accordance with some implementations. Processing begins at 602 and 604, when the application process initializes one or more loggers 602 and one or more log tailers are initialized.

It will be appreciated that steps 602, 606, 610, and 612 can be completed in parallel with independent steps 604 and 608. First steps 606, 610, and 612 are discussed before returning to discuss step 608.

At 606, the application process creates one or more row-oriented log files. Processing continues to 610.

At 610, the application logger logs new data. Processing continues to 612.

At 612, the application logger writes row-oriented binary data to one or more log files. Processing continues to 614.

At 608, the log tailer process creates a communication handshake for transmitting data to one or more data information servers. Processing continues to 614.

At 614, the log tailer process reads row-oriented data from the binary log file and transmits the data to a one or more data import servers. Processing continues to 616.

At 616, the one or more data import servers convert the binary row-oriented data into typed column-oriented table locations. An example of binary row-oriented data can include a stock symbol, a date, a time stamp, and a bid price. An example of converting the example row-oriented data into typed column-oriented table partitions can be adding the stock symbol to a stock symbol column partition, adding the date to a date column partition, adding the time stamp to a time stamp column partition, and adding the bid price to a bid price column partition. In this example, the row formation is not lost because each column partition is indexed in such a manner as to allow the retrieval of the entire row. Processing continues to 618 and 622.

At 618, the one or more data import servers keeps and persists state associated with each table location associated with the imported data. To keep and persist state, the one or more data import servers can keep track of connections that have subscribed to advertisements about the existence of new data locations for a table, or the size in rows of individual table data locations.

At 622, the one or more data import servers write the converted data to local memory cache. The one or more data import servers can write the converted data into buffers that can be set up as columns with metadata. Processing continues to 624.

At 624, the one or more data import servers write the converted data from the cache buffers to columns on a hard drive or other persistent storage. Processing continues to 626 and 632.

At 626, the one or more data import servers advertises to clients, such as table data cache proxies and remote query processors of the existence of new available data. Processing continues to 630.

At 630, clients can request data from the data import server. Processing continues to 634.

At 634, data is read by the requesting client, either directly from the data import server cache or by repopulating the data import server cache from persistent storage.

At 632, the data import server records the number of completed table location rows written to cache and/or persistent storage and the associated log file and byte offset from which to start the next row.

At 636, the data import server synchronizes all column data to persistent storage.

It will be appreciated that synchronization can occur by writing any unwritten (i.e. dirty) cache buffers, and forcing all associated dirty operating system buffers to be flushed. Processing continues to 638.

At 638, the data import server writes a checkpoint to persistent storage that includes the table location size in rows and the log file and byte offset to resume from for the next row. Processing continues to 638.

At 640, the data import server updates persisted table location metadata if necessary.

It will be appreciated that a confirmation (or commit) process (e.g. 632 followed by 636 followed by 638 followed b 640), can generally include the steps of (1) determining a complete set of data currently written to cache or persistent storage but not necessarily synchronized and/or committed, and a corresponding log file and offset information; (2) synchronizing all buffers to persistent storage; and (3) atomically writing a checkpoint (or commit) record, which can include metadata about the determined complete set of data currently written to cache or persistent storage and the corresponding log file and offset information.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for the importation, presentation, and persistent storage of data.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer data system for importing and presenting data for a computer system having cache memory buffers, persistent storage, and a listener device, the computer data system comprising
one or more processors;
computer readable storage coupled to the one or more processors, the computer readable storage having stored thereon instructions that, when executed by the one or more processors, cause the one or more processors to perform operations including:
starting a logging process to receive a stream of data;
creating in a computer memory device one or more log files;
starting a log tailer process for reading data from the one or more log files and transmitting data read from log files;
starting a listener to parse received log data to be appended to columns;
receiving a stream of data by the logging process;
the logging process writing the data into the one or more log files in a computer memory;
the log tailer process reading data from the one or more log files;
the log tailer process transmitting the data to one or more data import servers;
parsing the data with the listener;
at the one or more data import servers, writing the data to one or more columns of the associated table location in cache memory buffers, for immediate use by data consumers and for writing to persistent storage;
confirming, at the one or more data import servers, a current number of rows of data written to the cache memory buffers;
synchronizing, at the one or more data import servers, the column data from the cache memory buffers into a persistent table data store;
updating, at the one or more data import servers, table location metadata; and
writing a check point for the persisted data for use in resuming import after a system fault.

2. The computer data system of claim 1, the operations further including:
advertising an existence of imported table location data available in the cache memory buffers.

3. The computer data system of claim 1, wherein writing a check point for the cache memory buffers includes at least one of:
a table location size in rows; and
a log file and byte-offset to resume from for the table location next row.

4. The computer data system of claim 1, the operations further including:

writing state associated with each table location imported from the application process logs.

5. The computer data system of claim 4, wherein the processor applies the state to validate data written to the persistent table data store.

6. The computer data system of claim 1, wherein the logging process writes the data into the one or more log files in a computer memory by applying schema-specified, generated code to format the data; and wherein the listener is generated from a schema.

7. The system of claim 6, wherein the table location metadata comprises a version identifier of a schema used to generate the schema-specified, generated code used to format the data.

8. The computer data system of claim 1, wherein the one or more log files are row-oriented.

9. The system of claim 1, wherein the one or more data import servers are remote from the log trailer process.

10. The system of claim 1, the operations further including:
generating the listener based on a schema; and
generating formatting code based on the same schema,
wherein the logging process writing the data into the one or more log files in a computer memory comprises formatting the data by executing the generated formatting code to format the data for output to the one or more log files.

11. A method for importing and presenting data for computer system use, the method comprising:
starting with a processor a logging process to receive a stream of data;
creating in a computer memory device one or more log files;
starting with a processor a log tailer process for reading data from the one or more log files and transmitting data read from log files;
starting a listener to parse received log data to be appended to columns;
receiving a stream of data by the logging process;
the logging process writing the data into the one or more log files in a computer memory;
the log toiler process reading data from the one or more log files;
the log tailer process transmitting the data to one or more data import servers;
parsing the data with the listener;
at the one or more data import servers, writing the data to one or more columns of the associated table location in cache memory buffers, for immediate use by data consumers and for writing to persistent storage;
confirming, at the one or more data import servers, a current number of rows of data written to the cache memory buffers;
synchronizing, at the one or more data import servers, the column data from the cache memory buffers into a persistent table data store;
updating, at the one or more data import servers, table location metadata; and
writing a check point for the persisted data for use in resuming import after a system fault.

12. The method of claim 11, further comprising:
advertising an existence of imported table location data available in the cache memory buffers.

13. The method of claim 11, wherein writing a check point for the cache memory buffers includes at least one of:
a table location size in rows; and
a log file and byte-offset to resume from for the table location next row.

14. The method of claim 11, further comprising:
writing state associated with each table location imported from the application process logs.

15. The method of claim 11, wherein the processor applies the state to validate data written to the persistent table data store.

16. The method of claim 11, wherein the logging process writes the data into the one or more log files in a computer memory by applying schema-specified, generated code to format the data; and wherein the listener is generated from a schema.

17. The method of claim 16, wherein the table location metadata comprises a version identifier of a schema used to generate the schema-specified, generated code used to format the data.

18. The method of claim 11, wherein the one or more log files are row-oriented.

19. The method of claim 11, wherein the one or more data import servers are remote from the log tailer process.

20. The method of claim 11, further comprising:
generating the listener based on a schema; and
generating formatting code based on the same schema,
wherein the logging process writing the data into the one or more log files in a computer memory comprises formatting the data by executing the generated formatting code to format the data for output to the one or more log files.

21. A nontransitory computer readable medium having stored thereon software instructions that, when executed by one or more processors, cause the one or more processors to perform operations including:
starting a logging process to receive a stream of data;
creating in a computer memory device one or more log files,
starting a log tailer process for reading data from the one or more log files and transmitting data read from log files;
starting a listener to parse received log data to be appended to columns;
receiving a stream of data by the logging process;
the logging process writing the data into the one or more log files in a computer memory;
the log tailer process reading data from the one or more log files;
the log tailer process transmitting the data to one or more data import servers;
parsing the data with the listener;
at the one or more data import servers, writing the data to one or more columns of the associated table location in cache memory buffers, for immediate use by data consumers and for writing to persistent storage;
confirming, at the one or more data import servers, a current number of rows of data written to the cache memory buffers;
synchronizing, at the one or more data import servers, the column data from the cache memory buffers into a persistent table data store;
updating, at the one or more data import servers, table location metadata; and
writing a check point for the persisted data for use in resuming import after a system fault.

22. The nontransitory computer readable medium of claim 21, the operations further including:
advertising an existence of imported table location data available in the cache memory buffers.

23. The nontransitory computer readable medium of claim 21, wherein writing a check point for the cache memory buffers includes at least one of:
   a table location size in rows; and
   a log file and byte-offset to resume from for the table location next row.

24. The nontransitory computer readable medium of claim 21, the operations further including:
   writing state associated with each table location imported from the application process logs.

25. The nontransitory computer readable medium of claim 21, wherein the logging process writes the data into the one or more log files in a computer memory by applying schema-specified, generated code to format the data and wherein the listener is generated from a schema.

26. The nontransitory computer readable medium of claim 21, wherein the table location metadata comprises a version identifier of a schema used to generate the schema-specified, generated code used to format the data.

27. The nontransitory computer readable medium of claim 21, wherein the one or more log files are row-oriented.

28. The nontransitory computer readable medium of claim 21, wherein the one or more data import servers are remote from the log tailer process.

29. The nontransitory computer readable medium of claim 21, the operations further including:
   generating the listener based on a schema; and
   generating formatting code based on the same schema,
      wherein the logging process writing the data into the one or more log files in a computer memory comprises formatting the data by executing the generated formatting code to format the data for output to the one or more log files.

* * * * *